US012774016B2

(12) United States Patent
Palmisano et al.

(10) Patent No.: US 12,774,016 B2
(45) Date of Patent: Oct. 27, 2026

(54) ENHANCING ANTIVIRAL CAPABILITIES OF RAIL VEHICLES AND AIR FILTER

(71) Applicants: Bombardier Transportation GmbH, Berlin (DE); Filtration Control Ltd, Northampton (GB)

(72) Inventors: Domenico Palmisano, Marcq en Baroeul (FR); Damien Compagnon, Berlin (DE); Adam Hughes, Northampton (GB)

(73) Assignees: Bombardier Transportation GmbH, Berlin (DE); Filtration Control Ltd, Northampton (GB)

( * ) Notice: Subject to any disclaimer, the term of this patent is extended or adjusted under 35 U.S.C. 154(b) by 289 days.

(21) Appl. No.: 18/021,908

(22) PCT Filed: Feb. 5, 2021

(86) PCT No.: PCT/EP2021/052786
§ 371 (c)(1),
(2) Date: Feb. 17, 2023

(87) PCT Pub. No.: WO2022/037807
PCT Pub. Date: Feb. 24, 2022

(65) Prior Publication Data

US 2023/0356760 A1 Nov. 9, 2023

(30) Foreign Application Priority Data

Aug. 20, 2020 (GB) .................................... 2013004

(51) Int. Cl.
*B01D 46/00* (2022.01)
*B61D 27/00* (2006.01)
(Continued)

(52) U.S. Cl.
CPC .......... *B61D 27/009* (2013.01); *B01D 46/00* (2013.01); *B01D 46/0028* (2013.01);
(Continued)

(58) Field of Classification Search
CPC ........................... B01D 46/00; B01D 46/0028
See application file for complete search history.

(56) References Cited

U.S. PATENT DOCUMENTS 4,418,662 A 12/1983 Engler et al.
4,901,702 A 2/1990 Beicht et al.
(Continued)

FOREIGN PATENT DOCUMENTS

BR 102020016977 A2 3/2022
CA 2086194 C 9/1995
(Continued)

OTHER PUBLICATIONS

American Public Transportation Association, APTA Standards: APTA-SS-ISS-WP-001-20, Cleaning and Disinfecting Transit Vehicles and Facilities During a Contagious Virus Pandemic, section 5.3 HVAC management, 2020, pp. 23 to 26.
(Continued)

*Primary Examiner* — Robert A Hopkins
(74) *Attorney, Agent, or Firm* — The Webb Law Firm

(57) ABSTRACT

Disclosed are a system and method for enhancing antiviral capabilities of rail vehicles using an air filter. The air filter has a filter structure including an antiviral material, the antiviral material having particles comprising silver, and, in particular, including a composition containing silver, and the antiviral material also including liposomes. Further disclosed are methods for operating air treatment systems of a rail vehicle so as enhance antiviral capabilities.

6 Claims, 1 Drawing Sheet

(51) Int. Cl.
*F24F 8/108* (2021.01)
*B61L 15/00* (2006.01)
*B61L 27/10* (2022.01)

(52) U.S. Cl.
CPC ........... *F24F 8/108* (2021.01); *B61L 15/0072* (2013.01); *B61L 27/10* (2022.01)

(56) References Cited

U.S. PATENT DOCUMENTS 4,953,514 A 9/1990 Beicht et al.
5,143,120 A 9/1992 Tinz et al.
5,145,500 A 9/1992 Nolen, Jr.
5,176,082 A 1/1993 Chun et al.
5,184,591 A 2/1993 Sausner et al.
5,188,646 A 2/1993 Nolen, Jr.
5,429,097 A 7/1995 Wojts-Saary et al.
5,501,723 A 3/1996 Andress et al.
RE35,236 E 5/1996 Nolen, Jr.
5,571,300 A 11/1996 Stemmer
5,616,169 A 4/1997 De Ruiter et al.
5,620,505 A 4/1997 Koch et al.
5,681,462 A 10/1997 Brockhoff et al.
5,704,953 A 1/1998 Stemmer
5,746,794 A 5/1998 Hamm et al.
5,837,018 A 11/1998 Georg
5,858,045 A 1/1999 Stemmer et al.
5,879,423 A 3/1999 Luka et al.
5,922,096 A 7/1999 Stemmer
5,937,922 A 8/1999 Hör et al.
5,942,323 A 8/1999 England
6,029,719 A 2/2000 Hor et al.
6,039,780 A 3/2000 Hummel et al.
6,148,806 A 11/2000 Mueller
6,156,089 A 12/2000 Stemmer et al.
6,265,024 B1 7/2001 England
6,290,635 B1 9/2001 Demmel et al.
6,300,276 B1 10/2001 De Ruiter et al.
6,402,819 B1 6/2002 De Ruiter et al.
6,488,731 B2 12/2002 Schultheiss et al.
6,841,244 B2 1/2005 Foss et al.
6,875,353 B2 4/2005 Natalizia
6,893,571 B2 5/2005 Harenbrock et al.
7,214,645 B2 5/2007 Trnetschek et al.
7,468,564 B2 12/2008 Crisafulli
7,493,895 B2 2/2009 Klatt et al.
7,503,954 B2 3/2009 Haefner et al.
7,621,989 B2 11/2009 Forslund
7,637,974 B2 12/2009 Scholl et al.
7,758,677 B2 7/2010 Walz
7,895,983 B2 3/2011 Braithwaite et al.
7,939,642 B2 5/2011 Scott et al.
8,016,123 B2 9/2011 Gohle et al.
8,075,658 B2 12/2011 Volkmer et al.
8,272,371 B2 9/2012 Fasold et al.
8,328,022 B2 12/2012 Mbadinga-Mouanda et al.
8,404,015 B2 3/2013 Moser et al.
8,479,924 B2 7/2013 Mbadinga-Mouanda et al.
8,529,675 B2 9/2013 Durst et al.
8,695,479 B2 4/2014 Mitsch
8,701,290 B2 4/2014 Sprainis et al.
8,709,138 B2 4/2014 Lazarevic et al.
8,709,139 B2 4/2014 Veeser et al.
8,746,462 B2 6/2014 Mbadinga-Mouanda et al.
8,747,849 B2 6/2014 Scott et al.
8,757,394 B2 6/2014 Maier et al.
8,783,670 B2 7/2014 Sprainis et al.
8,889,398 B2 11/2014 Pelet et al.
8,919,492 B2 12/2014 Metzger et al.
8,962,311 B2 2/2015 Valarche et al.
8,968,445 B2 3/2015 Lindahl et al.
9,028,221 B2 5/2015 Hritz
9,095,796 B2 8/2015 Maier et al.
9,283,945 B1 3/2016 Kernwein et al.
9,296,278 B2 3/2016 Stinzendoerfer et al.
9,370,763 B2 6/2016 England
9,404,488 B2 8/2016 Knox et al.
9,466,850 B2 10/2016 Scope et al.
9,566,731 B2 2/2017 Gehwolf et al.
9,630,475 B2 4/2017 Bayerlein et al.
9,669,343 B2 6/2017 Stinzendoerfer et al.
9,676,380 B2 6/2017 Andrews et al.
9,687,763 B2 6/2017 Behrendt et al.
9,748,591 B2 8/2017 Scope et al.
9,776,121 B2 10/2017 Volk et al.
9,844,999 B2 12/2017 Krause
9,846,025 B2 12/2017 Kirchner et al.
9,856,866 B2 1/2018 Moore et al.
9,863,829 B2 1/2018 Caesar et al.
9,956,515 B2 5/2018 Stinzendoerfer et al.
10,081,378 B2 9/2018 Ruhland et al.
10,105,636 B2 10/2018 Woitoll et al.
10,164,280 B2 12/2018 Scope et al.
10,189,701 B2 1/2019 Caesar et al.
10,214,079 B2 2/2019 Hasan et al.
10,220,341 B2 3/2019 Driss et al.
10,232,295 B2 3/2019 Winters et al.
10,300,419 B2 5/2019 Scope et al.
10,315,146 B2 6/2019 Schacht et al.
10,350,219 B2 * 7/2019 Karandikar ............. A61L 15/28
10,428,020 B2 * 10/2019 Monteiro ............ C08F 293/005
10,435,005 B2 10/2019 Abbott
10,472,751 B2 11/2019 Traser et al.
10,513,167 B2 12/2019 Bayerlein et al.
10,532,309 B2 1/2020 Piry et al.
10,780,383 B2 9/2020 Scholz et al.
10,786,773 B2 9/2020 Brack et al.
10,898,848 B2 1/2021 Woitoll et al.
10,919,551 B2 2/2021 Ruhland et al.
11,014,038 B2 5/2021 Hitzke et al.
11,027,596 B2 6/2021 Bayerlein et al.
11,065,942 B2 7/2021 Keller et al.
11,071,936 B2 7/2021 Ewald et al.
11,273,398 B2 3/2022 Spelter et al.
11,634,011 B2 4/2023 Keller et al.
2002/0011051 A1 1/2002 Schultheib et al.
2002/0174772 A1 11/2002 Eberle
2003/0037521 A1 2/2003 Chicks et al.
2003/0121860 A1 7/2003 Harenbrock et al.
2003/0153458 A1 8/2003 Trnetschek et al.
2004/0074841 A1 4/2004 Natalizia
2004/0231646 A1 11/2004 Klatt et al.
2006/0000197 A1 1/2006 Haefner et al.
2006/0016340 A1 1/2006 Braeunling et al.
2006/0108278 A1 5/2006 Scholl et al.
2006/0123991 A1 6/2006 Braeunling et al.
2006/0130659 A1 6/2006 Durst et al.
2006/0142154 A1 6/2006 Wolff
2006/0169144 A1 8/2006 Forslund
2006/0225574 A1 10/2006 Braeunling et al.
2007/0084162 A1 4/2007 Seipler et al.
2007/0186904 A1 8/2007 Braithwaite et al.
2008/0060524 A1 3/2008 Tumbrink et al.
2008/0076346 A1 3/2008 Ahmed
2008/0178586 A1 7/2008 Crisafulli
2008/0236121 A1 10/2008 Volkmer et al.
2009/0044503 A1 2/2009 Ammersdoerfer
2009/0068198 A1 3/2009 Scott et al.
2009/0178565 A1 7/2009 Walz
2009/0261032 A1 10/2009 Gohle et al.
2009/0317405 A2 12/2009 Scott et al.
2010/0050860 A1 3/2010 Mitsch
2010/0101199 A1 4/2010 Veeser et al.
2010/0116601 A1 5/2010 Andrews et al.
2010/0162888 A1 7/2010 Blücher et al.
2010/0193294 A1 8/2010 Hritz
2010/0235937 A1 9/2010 Valarche et al.
2010/0242928 A1 9/2010 Fasold et al.
2011/0067574 A1 3/2011 Walz et al.
2011/0209619 A1 9/2011 Lazarevic et al.
2011/0243955 A1 10/2011 Scott et al.
2012/0040217 A1 2/2012 Kritzer et al.
2012/0067215 A1 3/2012 Lindahl et al.
2012/0097593 A1 4/2012 Maier et al.
2012/0192710 A1 8/2012 Moore et al.

(56) References Cited

U.S. PATENT DOCUMENTS

| | | | |
|---|---|---|---|
| 2012/0234741 | A1 | 9/2012 | Hritz |
| 2012/0234749 | A1 | 9/2012 | Maier et al. |
| 2012/0248026 | A1 | 10/2012 | Maier et al. |
| 2012/0304629 | A1 | 12/2012 | Metzger et al. |
| 2014/0157990 | A1 | 6/2014 | Piry et al. |
| 2014/0176711 | A1 | 6/2014 | Kirchner et al. |
| 2014/0234134 | A1 | 8/2014 | Knox, II et al. |
| 2014/0291222 | A1 | 10/2014 | Behrendt et al. |
| 2014/0305088 | A1 | 10/2014 | Maier et al. |
| 2015/0075369 | A1 | 3/2015 | Kapadia et al. |
| 2015/0115500 | A1 | 4/2015 | Gehwolf et al. |
| 2015/0135665 | A1 | 5/2015 | Bayerlein et al. |
| 2015/0225695 | A1 | 8/2015 | Valarche et al. |
| 2015/0273985 | A1 | 10/2015 | Luley et al. |
| 2015/0311554 | A1 | 10/2015 | Scope et al. |
| 2016/0121698 | A1 | 5/2016 | Krause |
| 2016/0129383 | A1 | 5/2016 | Volk et al. |
| 2016/0296871 | A1 | 10/2016 | Scope et al. |
| 2017/0077537 | A1 | 3/2017 | Scope et al. |
| 2017/0120178 | A1 | 5/2017 | Schacht et al. |
| 2017/0128870 | A1 | 5/2017 | Schmitt et al. |
| 2017/0189847 | A1 | 7/2017 | Hasan et al. |
| 2017/0217763 | A1 | 8/2017 | Caesar et al. |
| 2017/0219448 | A1 | 8/2017 | Caesar et al. |
| 2017/0267069 | A1 | 9/2017 | Bayerlein et al. |
| 2017/0358812 | A1 | 12/2017 | Scope et al. |
| 2018/0057983 | A1 | 3/2018 | Traser et al. |
| 2018/0085697 | A1 | 3/2018 | Piry et al. |
| 2018/0154298 | A1 | 6/2018 | Brack et al. |
| 2018/0250621 | A1 | 9/2018 | Scholz et al. |
| 2019/0001253 | A1 | 1/2019 | Hitzke et al. |
| 2019/0119970 | A1 | 4/2019 | Erlacher et al. |
| 2019/0165399 | A1 | 5/2019 | Woitoll et al. |
| 2019/0214019 | A1 | 7/2019 | White et al. |
| 2019/0217238 | A1 | 7/2019 | Gehwolf |
| 2019/0336899 | A1 | 11/2019 | Keller et al. |
| 2019/0337360 | A1 | 11/2019 | Keller et al. |
| 2019/0381985 | A1 | 12/2019 | Burress et al. |
| 2020/0016959 | A1 | 1/2020 | Stahl et al. |
| 2020/0030727 | A1 | 1/2020 | Spelter et al. |
| 2020/0030733 | A1 | 1/2020 | Ewald et al. |
| 2020/0031204 | A1 | 1/2020 | Keller et al. |
| 2020/0047103 | A1 | 2/2020 | Hasenfratz et al. |
| 2020/0129911 | A1 | 4/2020 | Ewald et al. |
| 2020/0156447 | A1 | 5/2020 | Bayerlein et al. |
| 2020/0188835 | A1 | 6/2020 | England |
| 2020/0217275 | A1 | 7/2020 | Krauss et al. |
| 2020/0376305 | A1 | 12/2020 | Lang |
| 2021/0031131 | A1 | 2/2021 | Rauschmaier et al. |
| 2021/0129060 | A1 | 5/2021 | Zisslsberger et al. |
| 2021/0268427 | A1 | 9/2021 | Diersch |
| 2021/0275953 | A1 | 9/2021 | Schulz et al. |
| 2021/0367285 | A1 | 11/2021 | Bauditsch et al. |
| 2022/0008859 | A1 | 1/2022 | Gusek et al. |
| 2022/0016567 | A1 | 1/2022 | Mbadinga Mouanda et al. |
| 2022/0032232 | A1 | 2/2022 | Zapf et al. |
| 2022/0054699 | A1 | 2/2022 | Nakama et al. |
| 2022/0152544 | A1 | 5/2022 | Ebnet et al. |
| 2022/0212516 | A1 | 7/2022 | Frenznick |
| 2023/0150553 | A1 | 5/2023 | Maita et al. |

FOREIGN PATENT DOCUMENTS

| | | | |
|---|---|---|---|
| CN | 202113374 | U | 1/2012 |
| CN | 205257708 | U | 5/2016 |
| CN | 205439882 | U | 8/2016 |
| CN | 206171124 | U | 5/2017 |
| CN | 207641154 | U | 7/2018 |
| CN | 208018316 | U | 10/2018 |
| CN | 208817604 | U | 5/2019 |
| CN | 208870716 | U | 5/2019 |
| CN | 110316209 | A | 10/2019 |
| CN | 110481573 | A | 11/2019 |
| CN | 210363831 | U | 4/2020 |
| CN | 210526522 | U | 5/2020 |
| CN | 111422035 | A | 7/2020 |
| CN | 111473439 | A | 7/2020 |
| CN | 210980193 | U | 7/2020 |
| CN | 111532292 | A | 8/2020 |
| CN | 211676781 | U | 10/2020 |
| CN | 211676845 | U | 10/2020 |
| CN | 211778299 | U | 10/2020 |
| CN | 211864270 | U | 11/2020 |
| CN | 112141173 | A | 12/2020 |
| CN | 212362275 | U | 1/2021 |
| CN | 112793396 | A | 5/2021 |
| CN | 214148252 | U | 9/2021 |
| CN | 114701529 | A | 7/2022 |
| CN | 114712397 | A | 7/2022 |
| CN | 114712937 | A | 7/2022 |
| CN | 114715207 | A | 7/2022 |
| CN | 114715208 | A | 7/2022 |
| CN | 114715211 | A | 7/2022 |
| CN | 114733306 | A | 7/2022 |
| CN | 114735038 | A | 7/2022 |
| CN | 114750793 | A | 7/2022 |
| CN | 114750794 | A | 7/2022 |
| CN | 114767916 | A | 7/2022 |
| CN | 114771587 | A | 7/2022 |
| CN | 114771590 | A | 7/2022 |
| CN | 114789742 | A | 7/2022 |
| CN | 114802330 | A | 7/2022 |
| CN | 114802331 | A | 7/2022 |
| CN | 114834494 | A | 8/2022 |
| DE | 1655766 | | 5/1971 |
| DE | 1958808 | | 6/1971 |
| DE | 1963879 | | 7/1971 |
| DE | 2141084 | | 10/1972 |
| DE | 2808495 | A1 | 8/1979 |
| DE | G8019041 | U1 | 3/1981 |
| DE | 3802664 | C1 | 10/1988 |
| DE | 3830722 | A1 | 3/1990 |
| DE | 4008266 | A1 | 9/1991 |
| DE | 4134222 | A1 | 4/1993 |
| DE | 4205101 | A1 | 8/1993 |
| DE | 4241274 | C1 | 1/1994 |
| DE | 4225272 | A1 | 2/1994 |
| DE | 4320384 | A1 | 12/1994 |
| DE | 4331586 | A1 | 3/1995 |
| DE | 4407149 | A1 | 9/1995 |
| DE | 4413606 | A1 | 11/1995 |
| DE | 19521666 | A1 | 1/1996 |
| DE | 4430333 | A1 | 3/1996 |
| DE | 4431496 | A1 | 3/1996 |
| DE | 19505175 | A1 | 8/1996 |
| DE | 19505583 | A1 | 8/1996 |
| DE | 19508534 | A1 | 9/1996 |
| DE | 19514885 | A1 | 10/1996 |
| DE | 19544990 | A1 | 6/1997 |
| DE | 19548180 | C1 | 7/1997 |
| DE | 19618413 | A1 | 11/1997 |
| DE | 19645173 | C1 | 4/1998 |
| DE | 19743890 | A1 | 4/1998 |
| DE | 19645192 | A1 | 5/1998 |
| DE | 19645665 | A1 | 5/1998 |
| DE | 19727295 | A1 | 1/1999 |
| DE | 19905928 | A1 | 8/1999 |
| DE | 19915534 | A1 | 10/2000 |
| DE | 10013315 | A1 | 9/2001 |
| DE | 10028654 | A1 | 12/2001 |
| DE | 10124846 | C1 | 5/2003 |
| DE | 10160497 | A1 | 6/2003 |
| DE | 10241302 | A1 | 3/2004 |
| DE | 10310109 | A1 | 9/2004 |
| DE | 10324341 | A1 | 2/2005 |
| DE | 10358386 | A1 | 7/2005 |
| DE | 102004031809 | A1 | 1/2006 |
| DE | 102004035967 | A1 | 3/2006 |
| DE | 102004000044 | A1 | 5/2006 |
| DE | 102004054970 | A1 | 5/2006 |
| DE | 102004058167 | A1 | 6/2006 |
| DE | 102004063434 | A1 | 7/2006 |
| DE | 102005016677 | A1 | 10/2006 |
| DE | 102005042407 | A1 | 3/2007 |

(56) References Cited

FOREIGN PATENT DOCUMENTS

| | | | | |
|---|---|---|---|---|
| DE | 102005043791 | A1 | 3/2007 | |
| DE | 102006043729 | A1 | 3/2008 | |
| DE | 202006016608 | U1 | 4/2008 | |
| DE | 202006018863 | U1 | 5/2008 | |
| DE | 20321611 | U1 | 7/2008 | |
| DE | 102006060580 | A1 | 7/2008 | |
| DE | 102007011365 | A1 | 9/2008 | |
| DE | 202007004794 | U1 | 9/2008 | |
| DE | 102007027026 | A1 | 12/2008 | |
| DE | 202007011586 | U1 | 2/2009 | |
| DE | 202007018075 | U1 | 6/2009 | |
| DE | 102008056793 | A1 | 2/2010 | |
| DE | 102008049625 | A1 | 4/2010 | |
| DE | 102008049927 | A1 | 4/2010 | |
| DE | 102008050814 | A1 | 4/2010 | |
| DE | 102009025392 | A1 | 12/2010 | |
| DE | 102009040202 | A1 | 4/2011 | |
| DE | 102009050878 | A1 | 4/2011 | |
| DE | 102009050257 | A1 | 5/2011 | |
| DE | 102009052123 | A1 | 5/2011 | |
| DE | 102010005114 | A1 | 7/2011 | |
| DE | 102010034059 | A1 | 2/2012 | |
| DE | 102011104628 | A1 | 12/2012 | |
| DE | 102011104630 | A1 | 12/2012 | |
| DE | 102011111368 | A1 | 2/2013 | |
| DE | 202013002809 | U1 | 10/2013 | |
| DE | 102013011511 | A1 | 1/2014 | |
| DE | 102014003885 | A1 | 10/2014 | |
| DE | 102013008389 | A1 | 11/2014 | |
| DE | 102013008392 | A1 | 11/2014 | |
| DE | 212013000130 | U1 | 4/2015 | |
| DE | 102013021071 | A1 | 6/2015 | |
| DE | 102015002323 | A1 | 8/2015 | |
| DE | 102014004220 | A1 | 10/2015 | |
| DE | 102014014006 | A1 | 3/2016 | |
| DE | 102015016446 | A1 | 12/2016 | |
| DE | 102015218205 | A1 | 3/2017 | |
| DE | 102016006073 | A1 | 11/2017 | |
| DE | 102016115441 | A1 | 2/2018 | |
| DE | 102016011754 | A1 | 4/2018 | |
| DE | 102018000357 | A1 | 7/2018 | |
| DE | 102017001380 | A1 | 8/2018 | |
| DE | 102017006462 | A1 | 1/2019 | |
| DE | 102018114351 | A1 | 1/2019 | |
| DE | 102018126333 | A1 | 5/2019 | |
| DE | 102018119220 | B3 | 8/2019 | |
| DE | 102018129286 | B3 | 8/2019 | |
| DE | 102019104476 | A1 | 8/2019 | |
| DE | 102018002447 | A1 | 9/2019 | |
| DE | 102018128963 | A1 | 5/2020 | |
| DE | 102019102104 | A1 | 7/2020 | |
| DE | 102019102680 | A1 | 8/2020 | |
| DE | 102019104148 | A1 | 8/2020 | |
| DE | 102019108348 | A1 | 10/2020 | |
| DE | 202020105751 | U1 | 12/2020 | |
| DE | 102019129776 | B3 | 1/2021 | |
| DE | 102019120646 | A1 | 2/2021 | |
| DE | 102020124160 | A1 | 5/2021 | |
| DE | 102020105750 | A1 | 9/2021 | |
| DE | 102020107345 | A1 | 9/2021 | |
| DE | 102020118293 | A1 | 1/2022 | |
| DE | 102020120248 | A1 | 2/2022 | |
| DE | 102020123461 | A1 | 3/2022 | |
| DE | 102021206802 | B3 | 7/2022 | |
| EP | 0484657 | A1 | 5/1992 | |
| EP | 2684591 | A1 | 1/2014 | |
| EP | 2805759 | A1 | 11/2014 | |
| EP | 3015297 | A1 | 5/2016 | |
| EP | 3162425 | A1 | 5/2017 | |
| EP | 3167949 | A1 | 5/2017 | |
| EP | 3332858 | A1 | 6/2018 | |
| EP | 3372295 | A1 | 9/2018 | |
| EP | 3110835 | B1 | 1/2019 | |
| EP | 3286367 | B1 | 6/2019 | |
| EP | 3492159 | A1 | 6/2019 | |
| EP | 3520878 | A1 | 8/2019 | |
| EP | 3586939 | A1 | 1/2020 | |
| EP | 3599009 | A1 | 1/2020 | |
| EP | 3643390 | A1 | 4/2020 | |
| EP | 3750614 | A1 | 12/2020 | |
| EP | 3848109 | A1 | 7/2021 | |
| EP | 3319424 | B1 | 10/2021 | |
| EP | 3903906 | A1 | 11/2021 | |
| EP | 3500801 | B1 | 3/2022 | |
| GB | 1207264 | | 9/1970 | |
| GB | 1294987 | | 11/1972 | |
| GB | 1331926 | | 9/1973 | |
| GB | 1395788 | | 5/1975 | |
| GB | 2508743 | A | 6/2014 | |
| JP | 2011132628 | A | 7/2011 | |
| JP | 2011168159 | A | 9/2011 | |
| JP | 2020099580 | A | 7/2020 | |
| JP | 202299446 | A | 7/2022 | |
| JP | 2022105443 | A | 7/2022 | |
| KR | 1020110019925 | A | 3/2011 | |
| KR | 101317166 | B1 | 10/2013 | |
| KR | 102088745 | B1 | 5/2020 | |
| KR | 1020220089011 | A | 6/2022 | |
| KR | 1020220089058 | A | 6/2022 | |
| KR | 1020220095044 | A | 7/2022 | |
| PL | 242709 | B1 | 5/2021 | |
| SI | 25751 | A | 6/2019 | |
| TW | M447478 | U1 | 2/2013 | |
| WO | WO-9416061 | A1 * | 7/1994 | ........... A61K 9/1272 |
| WO | 9807655 | A1 | 2/1998 | |
| WO | 2005078432 | A2 | 8/2005 | |
| WO | 2007039037 | A1 | 4/2007 | |
| WO | 2010039680 | A1 | 4/2010 | |
| WO | 2010049052 | A1 | 5/2010 | |
| WO | 2010065090 | A2 | 6/2010 | |
| WO | 2011032090 | A1 | 3/2011 | |
| WO | 2011129729 | A1 | 10/2011 | |
| WO | 2012025582 | A2 | 3/2012 | |
| WO | 2014153333 | A1 | 9/2014 | |
| WO | 2015161228 | A1 | 10/2015 | |
| WO | 2016016078 | A1 | 2/2016 | |
| WO | 2016016085 | A1 | 2/2016 | |
| WO | 2016169752 | A1 | 10/2016 | |
| WO | 2016183237 | A1 | 11/2016 | |
| WO | 2017032626 | A1 | 3/2017 | |
| WO | 2018033172 | A1 | 2/2018 | |
| WO | 2018224299 | A1 | 12/2018 | |
| WO | 2019040707 | A2 | 2/2019 | |
| WO | 2019134767 | A1 | 7/2019 | |
| WO | WO-2020025477 | A1 * | 2/2020 | ............. B01D 29/21 |
| WO | 2020058475 | A1 | 3/2020 | |
| WO | 2021191140 | A1 | 9/2021 | |
| WO | 2021191141 | A1 | 9/2021 | |
| WO | 2021228221 | A1 | 11/2021 | |
| WO | 2022062618 | A1 | 3/2022 | |
| WO | 2022157951 | A1 | 7/2022 | |
| WO | 2022157964 | A1 | 7/2022 | |

OTHER PUBLICATIONS

Ford Media Center, Packing Heat: How Ford's Latest Tech Helps Police Vehicles Neutralize Covid-19, May 27, 2020, Dearborn, MI.

Gröndahl, Mika, et al., "What Happens to Viral Particles on the Subway", New York Times, Aug. 10, 2020, https://www.nytimes.com/interactive/2020/08/10/nyregion/nyc-subway-coronavirus.html.

HeiQ-Swiss Tech Inside, "Effective and skin-safe antiviral textile technology—HeiQ Viroblock NPJO3", 2020, https://www.heiq.com/news/heiq-viroblock-antiviral-textile-technology-against-coronavirus/.

HeiQ Materials AG, "Antivirale Textiltechnologie HeiQ Viroblock NPJ03 als wirksam gegen das Coronavirus getestet", Mar. 19, 2020.

HeiQ, "Antiviral textile technology HeIQ Viroblock NPJ03 as effective against the coronavirus tested", Mar. 19, 2020.

HeiQ, "HeiQ Viroblock NPJ03 Antiviral Textile Technology Tested Effective Against Coronavirus", PR Newswire, Mar. 16, 2020, https://www.prnewswire.com/news-releases/heiq-viroblock-npj03-

(56) References Cited

OTHER PUBLICATIONS antiviral-textile-technology-tested-effective-against-coronavirus-301024875.html.
HeiQ Viroblock, “Antiviral & Antiviral protection”, Jul. 2, 2020.
ISO 1814:2014(en) Textiles—Determination of antiviral activity of textile products, 2014.
LMS Technologies, Inc., Microbiology Report, 2020.
Microbe Investigations AG, “Microbe Investigations AG LS20-01349”, Jul. 3, 2020.
Purafil, “Purafil Helps Stop the Spread of Coronavirus with PuraWard Product”, May 21, 2020, https:\\www.purafil.com/purafil-helps-stop-spread-coronavirus-puraward-product.
Purafil Filtration Group, PuraWard Pleated Filter Merv 8, Dec. 1, 2020.
Purafil Filtration Group, PuraWard Pleated Filter Merv 11, Dec. 1, 2020.
Purafil Filtration Group, The Puraward Fiber, Product Bulletin, 2018.
Siemens, “Increasing Covid-19 resilience of public transport”, Siemens Mobility, Jul. 2020.
Von Stillfried, Axel, et al., “Minimization Opportunities for the Risk of Infection with SARS-COV-2 in Rail Passenger Transport”, ZEVrail 144, Aug. 8, 2020.

* cited by examiner

ENHANCING ANTIVIRAL CAPABILITIES OF RAIL VEHICLES AND AIR FILTER

CROSS REFERENCE TO RELATED APPLICATIONS

This application is the United States national phase of International Patent Application No. PCT/EP2021/052786 filed Feb. 5, 2021, and claims priority to British Patent Application No. 2013004.3 filed Aug. 20, 2020, the disclosures of which are hereby incorporated by reference in their entireties.

BACKGROUND OF THE INVENTION

Field of the Invention

The present disclosure is directed at enhancing antiviral and preferably also antibacterial capabilities of rail vehicles.

Description of Related Art

This, in particular, concerns operating a rail vehicle so that viral infections of its occupants are less likely. Specifically, the present disclosure concerns the technical field of operating a rail vehicle so as to reduce a risk of viral infections and in particular of adapting an air treatment system (e.g. a HVAC system) accordingly. Also, an air filter is disclosed for this purpose.

Facing the recent coronavirus pandemic, many measures have been suggested for reducing the viral spread throughout the population. A place where people from different backgrounds and in particular households gather in close proximity to one another is public transport and are in particular trains.

Apart from measures that occupants of trains and thus rail vehicles can carry out themselves to reduce the risk of a virus infection (e.g. wearing masks), there is a need to also provide measures on a technical evel to further reduce said risk.

SUMMARY OF THE INVENTION

According to a first basic concept, solutions concerning a new type of air filter for an air treatment system and in particular air conditioning system (AC system) or HVAC system (heating, ventilation, air conditioning system) are disclosed. The air filter may replace currently used filters. For doing so, it may comprise the similar dimensions and/or may be installable in same positions and/or receiving regions as currently used filters. While such currently used filters may substantially provide dust removal functions, the presently disclosed new type of filter advantageously provides also antiviral effects. Preferably, it has the capability of killing (i.e. inactivating) viruses in air flows passing through the filter.

This also means that the air filter can reduce the number of viruses caught up in the filter itself (i.e. by inactivating them). Advantageously, even clogged filters or filters with a reduced permeability (e.g. due to dust collection) enable a virus reduction due to viruses trapped in or passing the filter being inactivated.

The new type of filter advantageously requires no reconstructions or hardware adjustments on the part of the rail vehicle and in particular of its air treatment system (such as its HVAC system). Further, it is easy to install with little or no training, in particular when installing just like currently used (only dust-) filters.

The disclosure likewise suggests operating a rail vehicle so as to limit the number and in particular the density or concentration of occupants (e.g. carried passengers). This way, a close proximity of passengers may be prevented, said proximity causing a higher risk of the passengers infecting one another.

For doing so, the number of passengers may be estimated with help of a sensor. Preferably, the sensor measures a carbon dioxide (CO2) level and specifically a CO2 concentration within the rail vehicle and in particular the passenger compartment thereof to infer on the number of passengers. In case the passenger concentration/number exceeds an acceptable threshold, predetermined countermeasures may be activated. These may generally be designed to limit the number of additional passengers entering the rail vehicle or even preventing any further passengers from boarding.

Also, it is suggested to adjust the operation of an air treatment system and in particular AC system or HVAC system, so as to limit risk of a viral infection of (a current or future) occupants of the rail vehicle. Such measures are preferably implemented with little or no people on board the rail vehicle and in particular without any passengers (e.g. at night). For doing so, the temperature and/or fan speed of heated components (e.g. local convection heaters and/or low-level fan heaters) of the air treatment system (e.g. AC system or HVAC system) may be deliberately increased, so as to provide an antiviral effect (e.g. by actuating air flows thru these heated components and inactivating/killing viruses that are contained in air flows).

Generally, any antiviral capability disclosed herein may also be accompanied with an antibacterial capability. Accordingly, the antiviral effect of the disclosed air filter may also be accompanied with an antibacterial effect.

Additionally or alternatively, the volume of returned (i.e. recirculated) air may be reduced. In this way, the risk air-bound viruses being recirculated several times within the rail vehicle is limited. Rather, the chances of air-bound viruses being conveyed out of the vehicle by the air treatment system and/or exhaust air system may be increased, thereby reducing a risk of infections for the vehicle's occupants.

Any of the above measures can be implemented with limited or no adaptions to existing rail vehicles input, in particular on a hardware level. Also, they do not negatively affect passenger comfort or require any cooperation from passengers or frequent interventions by train personnel. They may thus generally represent background measures, while still being effective and reliable in terms of reducing a risk of infections.

Note that any of the measures disclosed herein may also be combined, e.g. by using the disclosed air filter in a rail vehicle having an air treatment system that is operated in a manner disclosed herein.

In general, any air treatment system as referred to herein may treat air by regulating any of the following, alone or in any combination:

- an air temperature;
- an air flow (e.g. its strength or volume per time):
- an air exchange between the interior and exterior, e.g. of a room, compartment or any enclosed space;
- an air purification (i.e. filtering);
- an air humidity, e.g. by humidifying and/or dehumidifying air.

In particular, an air filter for an air treatment system is suggested, the air filter having a filter structure comprising an antiviral material, the antiviral material having particles comprising silver (e.g. silver atoms) and the particles in particular comprising a composition containing silver, and the antiviral material also comprising liposomes. The particles are also referred to as silver-containing particles herein.

The filter structure may be a structure used to provide an air filtering and/or air purifying effect apart from virus removal and in particular virus inactivation. For example, the filter structure may comprise areas of limited permeability for matter and in particular particles. In one example, the filter structure provides a dust removing effect.

The filter structure may define act as a framework or carrier to which the antiviral material attaches and/or on which the antiviral material is deposited (e.g. by way of impregmentation). The filter structure may define the shape, stability and/or statics of the air filter, while the air filter may generally be flexible.

The silver-containing particles may be non-nanoparticles, i.e. may be larger than a nanoparticle. For example, a dimension and in particular diameter may at least amount to 100 or at least 1000 nanometers. In one example, the silver-containing particles are a reaction mass of silver chloride and titanium.

The particles may be silver sulfide particles or at least contain silver sulfide, the antiviral material thereby containing silver (e.g. silver atoms as part of the silver sulfide). The silver-containing particles may provide an antiviral effect or, differently put, antiviral mechanism, thereby inactivating the viruses.

As an example, the disclosed filter may generally be designed to inactivate the SARS COV 2 virus. This virus (but also other ones) is protected by a cholesterol lipid wall. The liposomes (i.e. vesicle vessels) start with no cholesterol and the vessels line up alongside the virus and deplete the viral membrane of its cholesterol. This allows the silver-containing particles and in particular silver chloride to destroy the interior and/or center of the virus rapidly The liposomes may in particular be fatty spherical vesicles. For example, they may be non-phospholipid vesicles.

The air filter may be a panel filter, e.g. having a substantially planar and/or polygonal shape. It may generally be configured to filter particulate matter and/or dust from the air. Additionally, it may provide an antiviral effect by inactivating air-bound or, differently put, airborne viruses.

For example, the silver-based particles may attract viruses and in particular attach thereto. This may be prompted by sulfur contained by the particles (in particular when these comprise or are silver sulfide). This keeps viruses within the filter, i.e. catches or captures them.

The liposomes may be free of any cholesterol content. They may generally be configured to deplete the viral membrane of viruses. This may provide better and in particular faster access of the silver-including particles to viable parts of the virus, thereby speeding up the inactivation (see above). The liposomes may thus act as boosters for the inactivation.

According to a preferred example, the filter structure is impregnated with the antiviral material. Apart from providing the antiviral capabilities, this also increases the stiffness of the filter, e.g. once the antiviral material dries and/or solidifies.

In a preferred aspect, the filter structure comprises a porous and/or cellular material. For example, the filter structure may be produced from a foam and in particular a polyether foam. Said foam may be hardened to provide some rigidity to the filter structure, while preferably still maintaining a certain flexibility to e.g. withstand shocks and vibrations. By providing respective pores or cells (e.g. by using a foam material) the permeability of the filter structure can be set to a desired level.

According to one example, the filter structure comprises a fire-retardent material, in particular a fire-retardent impregnation. The fire-retardant material may be or comprise a water-based latex compound and/or comprise aluminia hydrates and in particular aluminia tri-hydrates. Note that the fire-retardant material (and in particular any of the above exemplary components thereof) may further help to increase the stability and structural rigidity of the filter structure.

Also suggested is an air treatment system, in particular air conditioning system or HVAC system, of a rail vehicle, the air treatment system comprising an air filter according to any of the above aspects. Preventing viral infections by filtering the air in the above manner is particularly effective when used in a rail vehicle. Also, rail vehicles typically comprise an air treatment system and specifically air treatment systems comprising air filters. Thus, using an air filter according to one of the above aspects may require little or no technical adaptions of the rail vehicle (i.e. the air filter may be inserted into the existing air treatment system with little or no adjustments to said systems).

Also suggested is the use of an air filter according to any of the above aspects in an air treatment system of a rail vehicle, in particular in an air conditioning system or HVAC system of a rail vehicle.

Further, a method for producing an air filter is disclosed, in a particular an air filter according to any of the above aspects, the method comprising:

providing a filter structure;

exposing the filter structure to an antiviral material having particles comprising silver, in particular a composition containing silver, and the antiviral material comprising liposomes.

The production process may include the air filter passing under a number or spray nozzles e.g. on a conveyor belt set to a specific speed. As the filter passes under the nozzles the additive is preferably atomized through the nozzles and projected into the filter. The velocity of the additive may force it to penetrate into the air filter. The relationship between the speed of the conveyor and the flow rate of the additive may be used to control the scope or extent of impregnation (e.g. an impregnation percentage or ratio). Once impregnated the filters are preferably placed into an oven to speed up the curing process. As an example, 80° C. for 20 minutes has provided the good results.

Also disclosed is a method for operating a rail vehicle. According to said method, a passenger (i.e. occupant) number and/or a virus concentration is estimated or inferred on based on measurements by at least one sensor of the rail vehicle. It is then determined based on the passenger number, whether a predetermined critical condition is fulfilled and if that is the case, at least one predetermined countermeasure is prompted. Said countermeasure is preferably directed at preventing a further increase in the passenger number.

In more general terms, a method of operating a rail vehicle is disclosed, comprising the steps of:

determining whether a predetermined critical condition is fulfilled based on a sensor measurement of at least one sensor of the rail vehicle, the sensor measurement being representative of a passenger number and/or a virus concentration, and, if the condition is fulfilled:

prompting at least one predetermined countermeasure for preventing a further increase of the passenger number.

According to a preferred aspect, the predetermined critical condition may be fulfilled if the passenger number, the sensor measurement or a parameter determined based on any of the above exceeds a predetermined acceptable threshold. Generally, the predetermined critical condition may be a condition that is fulfilled when the passenger number or passenger concentration within the rail vehicle is unacceptably high. In this case, an increased risk of viral infections between the passengers occurs since a recommended distance between two individuals is difficult to maintain.

Any method disclosed herein may be carried out automatically and/or in a computer implemented manner. No manual input may be required and all steps may be carried out e.g. by a control unit of the rail vehicle or, as discussed below, of a train station or end device. On the other hand, a vehicle driver or personnel at the train station may be asked for confirmation, e.g. before a respective countermeasure is initiated.

In one example, the countermeasure may be implemented in the rail vehicle. For example, visual (e.g. by text) or audible notifications may be issued reminding passengers to keep a minimum distance from one another. Also, passengers may be motivated to leave the rail vehicle at an upcoming station. Further, visual or audible notifications may be issued that are directed at preventing further passengers at an upcoming rail station from entering the rail vehicle, e.g. by flashing lights installed at the vehicle's doors.

Additionally or alternatively, the countermeasure may be implemented outside of the rail vehicle. In this case, the rail vehicle may comprise a communication unit. The communication unit may be configured to communicate with at least one communication unit outside of the vehicle. It may alert said external communication unit in case the above critical condition is met and/or it may prompt said external communication unit to initiate the countermeasure.

The external communication unit may be part of the computer network and/or a computer server system (e.g. a centralized computer system of a train operator). It may be configured to, directly or indirectly, communicate with a control unit responsible for implementing the countermeasure or directly implement the countermeasure itself. Again, this may be done largely or fully automatically, so that a countermeasure can be remotely triggered by the rail vehicle. Still, human verification may be requested before the countermeasure is actually implemented.

The sensor may be a weight sensor, designed to determine the weight of the rail vehicle and in particular its current passenger load. For example, it may be a brutto weight sensor comprised by a suspension and in particular an air spring system. The passenger load may be a direct function of the passenger number. Alternatively, seat sensors us may be used to count occupied seats and thereby infer on a passenger number. Also, face recognition techniques (e.g. based on indoor camera systems) and/or entrance door counting systems may be used.

Preferably, however, the sensor is a carbon dioxide (CO2) sensor. This way, passengers may also be captured regardless of whether they are standing or sitting. Also, this measurement may be more reliable and is simpler to implement compared to using weight sensors. Often, air treatment systems and in particular HVAC systems already comprise CO2 sensors to e.g. regulate an amount of fresh air that is channeled into a passenger compartment. Thus, using CO2 sensors to infer on the passenger number may require little or no adjustments on a hardware level. Further, it has been determined that CO2 levels reliably represent passenger numbers. For example, they may adjust to changing passenger numbers within a matter of minutes.

Based on e.g. measurements or calculations, a link between a measured CO2 concentration and a passenger number may be determined upfront. Thus, a CO2 level (e.g. in units of parts per million) measured during operation may be associated with a certain passenger number e.g. by a stored table or mathematical function.

In one example, the countermeasure is implemented in a rail station, in particular an upcoming rail station that is approached by the rail vehicle. For doing so, the rail vehicle may directly or indirectly alert a control unit associated with and/or installed at said rail station. This latter control unit may then activate the countermeasure by sending control signals to units and/or actuators responsible for carrying out the countermeasure.

According to one example, the countermeasure comprises closing and/or locking of platform screen doors or other access restricting devices (e.g. gates or barriers) which restrict the access to the train station from a platform of the rail station. In a generally known manner, the platform may comprise a closed wall with screen doors, wherein a train can only be accessed via said screen doors. The train may stop so that its doors are positioned directly behind said screen doors.

There may be two platforms on different sides of the train both comprising such screen doors. One platform may be provided for passengers wanting to enter the train and the other (preferably opposite) platform may be provided for passengers exiting the train. In this case, the screen doors may only open at the latter platform. They may remain closed at the platform with passengers wanting to enter the train.

Additionally or alternatively, the countermeasure may comprise an automatic issuing of visual/optical and/or audible notifications (in particular warnings) within the train station. Again, said warnings may be directed at preventing passengers from entering the train, so as to not further increase the passenger number.

Further, countermeasures may be implemented on an end device (e.g. a computer unit, such as a PC), in particular a mobile end device (e.g. a smartphone), said end device being accessible by (e.g. associated with, operated and/or owned by) a customer (e.g. a potential passenger, interested in using a train). Again, the countermeasure may e.g. be a visual (e.g. via text and/or icons) or audible notification, indicating that an upcoming train should e.g. not be accessed due to a high passenger load.

Alternatively, a rail vehicle having a respectively high passenger load may be rendered inactive within a booking system or a trip planning software that is run on and/or accessible with the end device.

Further disclosed is a rail vehicle comprising at least one sensor and at least one control unit, wherein the control unit is configured to:

determine whether a predetermined critical condition is fulfilled based on a sensor measurement of the sensor, the sensor measurement being representative of a passenger number and/or virus concentration, and, if the condition is fulfilled:

prompt at least one predetermined countermeasure for preventing a further increase of the passenger number.

The disclosure also concerns a method of operating an air treatment system of a rail vehicle, the air treatment system treating air volumes supplied to a passenger compartment of the rail vehicle, the method comprising: operating the air treatment system in an anti-infection mode. In said mode, the air treatment system may provide an effect to reduce the risk of a viral infection of occupants of the rail vehicle.

In said anti-infection mode, other goals and/or regulating parameters usually used for controlling an air treatment system may not be applied and/or may be prioritised to lesser degree. For example, maintaining a temperature or humidity level may no longer be the main goal or set value for operating the air treatment system. Rather, the antiviral effect may be prioritised and e.g. tolerances with regard to a temperatures or humidity levels that are to be maintained may be increased.

In this context, the anti-infection mode may comprise a temperature increase of (and in particular within) the air treatment system at least up to a predetermined temperature level and exposing air volumes treated by (e.g. flowing through) the system to said temperature level. The temperature level may be a maximum temperature level that the air treatment system can apply and/or may at least amount to 70% of said maximum temperature level. Preferably, the temperature level amounts to at least 40° C., at least 100° C. or at least 200° C.

For providing the temperature increase, at least one heatable unit of the air treatment system may be set to a respectively increased temperature. Air volumes treated by the air treatment system may be channeled along and/or through said heatable unit, thereby being exposed to the increased temperature. This way, airborne viruses will be subjected to temperatures which can cause their inactivation. Nonetheless, the air treatment system may not be operated (e.g. (feedback) controlled to set a specific temperature e.g. in a passenger compartment). Rather, the focus may be to heat up the system internally to achieve the desired inactivation effect.

To the contrary, the typical function of a conventional HVAC system is filtering fresh air and/or return air before passing it to the saloon or passenger compartment of a rail vehicle. Any active cleaning of the interior and/or interior air is not considered.

The present disclosure instead suggests using an existing air treatment system and in particular HVAC system to perform a new air cleaning function. For doing so, apart from the temperature increase, an interior air flow may be set to a high level (e.g. at least 75% of a possible maximum level), thereby boosting the air volume flow of interior air within the cabin. The interior air flow may generally concern air that is feed and/or blown by the air treatment system into the rail vehicle, e.g. (re)circulated air.

Additionally, the temperature increase may be provided e.g. in or by a central HVAC unit of the air treatment system and/or with help of optional local or distributed fan heaters that are comprised by the air treatment system. This results in purifying the interior air and/or the interior (e.g. when coming into contact with the heated air which may help to inactivate viruses) from viruses.

Note that in this context, a share of fresh air taken in by the air treatment system from the exterior may be less than a share of recirculated air (e.g. less than half or less than a quarter). Preferably, no fresh air is taken it at all. This enables a particularly fast temperature increase that can be maintained at high levels for a desired period of time. Thus, in a preferred example, an interior air flow largely or fully consists of recirculated air which, due to the temperature increase, helps to purify the rail vehicle's interior of viruses and preferably of bacteria as well.

Preferably, the temperature increase is automatically activated. It may also be manually activated with, however, the possibility of an automatic activation preferably still being present. Thus, it can be ensured that the antiviral effect is provided independently of actions (and in particular missing actions) of e.g. a train conductor.

The automatic activation may e.g. take place when at least one of the following conditions is fulfilled (alone or in any combination), wherein each of the conditions may be automatically checked and/or verified by a control unit of the rail vehicle and in particular of its air treatment system:

- The rail vehicle is at standstill and/or free of any persons (e.g. passengers, train staff, maintenance crew). This may be determined based on an operating state of a traction system (in particular an inactive state thereof) and/or via speed sensors of the rail vehicle. The presence of passengers, on the other hand, may be inferred on via any of the sensor measurements for determining passenger numbers discussed above (e.g. a CO2 sensor). In case these measurements are below a defined threshold, an absence of passengers may be determined.
- A control unit of the rail vehicle determines the rail vehicle being at least temporarily out-of-service and/or being in a parked state. For doing so, operating parameters of the rail vehicle may be checked and in particular of its traction system. Similarly, the presence of a train conductor and/or possible inputs of the train conductor may be checked. Also, timetable information may be used which may indicate whether or not the vehicle should be in or out-of-service. Additionally or alternatively, a location of the rail vehicle may be determined. If it is at standstill on a track section typically dedicated for parking, cleaning or maintenance, an out-of-service-state may be determined.
- A timetable indicating the rail vehicle being out of service may likewise be used or verified as a condition. Similar to above, a control unit may use the timetable to determine whether the rail vehicle is currently out of service.
- A measurement by at least one sensor (e.g. any of the disclosed sensors for estimating passenger numbers), indicating a passenger number below of a predetermined threshold. The threshold may be one passenger, i.e. may be fallen below of when the passenger number is zero. Considering such a low threshold is advantageously implemented with help of seat sensors, door sensors or based on face recognition via interior cameras.

According to a preferred embodiment, the anti-infection mode comprises reducing a share of air that is recirculated by the air treatment system within a passenger compartment of the vehicle. The recirculated air may also be referred to as return air. It may be a share of an air volume or air flow channeled through (e.g. sucked in by and/or expelled from) the air treatment system. It may be sucked in from within the passenger compartment, but may be returned to said passenger compartment (and thus recirculated) instead of being channeled into the exterior.

It is generally known to operate air treatment systems so that a respective recirculation takes place. Yet, according to this embodiment, the recirculation is specifically adapted so as to provide an antiviral effect and, more specifically, to reduce a concentration of viruses in the air within the rail vehicle and in particular its passenger compartment.

This is done by reducing an amount of recirculated air, thereby avoiding that airborne viruses are recirculated multiple times within the passenger compartment.

Instead, as a further separate measure, the share of air that is expelled into the exterior may be increased and/or the share of air that is sucked in from the exterior (i.e. the share of fresh air) may be increased.

More precisely, at least one of the following may additionally be provided:

Increasing a volume of fresh air being taken in (i.e. sucked in and/or channeled in) from the surroundings or exterior. In this case, a previous ratio of fresh air and recirculated air is preferably not maintained, i.e. the recirculated air is not correspondingly increased but preferably maintained at a similar or lower level than before. This way, the fresh air can replace a lack of recirculated air, so as to avoid pressure drops. At the same time the risk of an increased virus concentration within the passenger compartment's air is limited.

Reducing a volume of recirculated air, while not maintaining a previous ratio of fresh air and recirculated air. In this case, the volume of recirculated air is actively reduced while the volume of fresh air may be maintained or, as above, may deliberately be increased.

The disclosure also relates to a rail vehicle comprising an air treatment system that is operable according to a method of any of the above aspects relating to an anti-infection mode.

In the following, embodiments of the invention will be discussed with reference to the attached schematic figures. Similar features and in particular features providing similar functions may be provided with the same reference signs throughout the figures. Embodiments discussed in connection with the figures may be combined in any suitable form.

DESCRIPTION OF THE INVENTION

Figure 1:
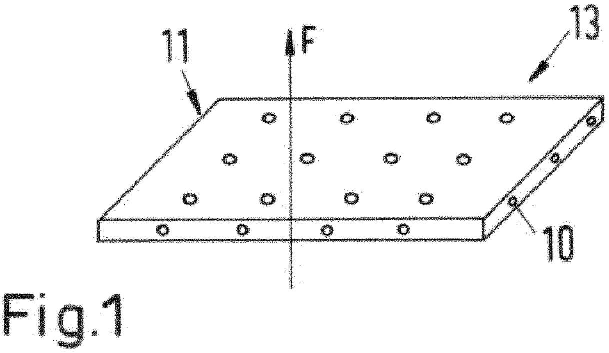
FIG. 1 depicts an air filter according to an embodiment of this disclosure.

FIG. 1 depicts an air filter 10 according to an example of this disclosure. The air filter 10 is configured as a panel filter having a flat, planar and, as a mere example, rectangular shape. The filter 10 comprises a filter structure 11 or, differently put, is made up of and/or structurally defined by said filter structure 11. In the shown example, the filter structure 11 is a hardened polyether foam providing in a network of schematically indicated pores.

Figure 2:
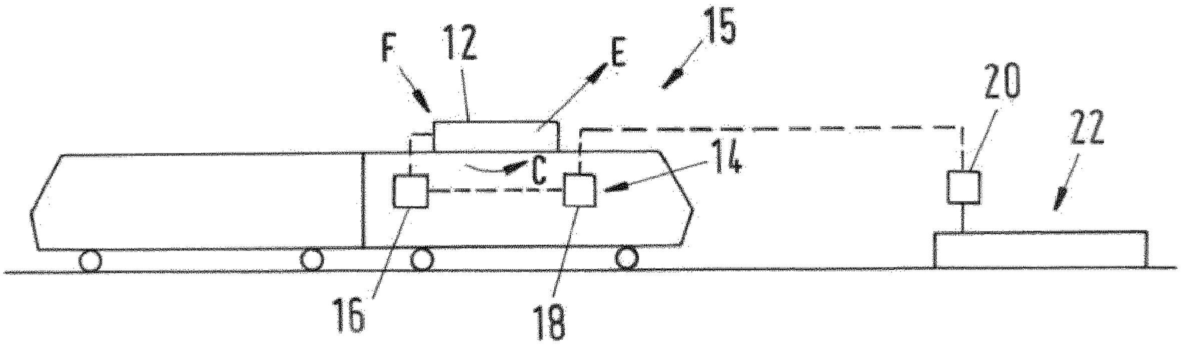
FIG. 2 depicts a rail vehicle implementing methods according to various embodiments of this disclosure.

The air filter 10 is installed in an air treatment system of e.g. a building or a vehicle and preferably in the rail vehicle 15 of FIG. 2. When installed, the air filter 10 is positioned in such a manner that an airflow passes through the filter 10 as indicated by a respective arrow F. Accordingly, the air passes through the porous filter structure 11 from one side of the filter 10 to the other. Dust contained in the air may thus be caught by the filter structure 11, thereby being filtered out of the airflow.

The filter 10 also comprises an anti-viral material 13. Specifically, the filter structure 11 is impregnated with an anti-viral material 13 comprising particles containing silver and further comprising liposomes, e.g. in form of fatty vesicules.

When the air passes through the filter 10 as indicated in FIG. 1, the above discussed antiviral effects may occur. Viruses contained in said airflow may interact with and in particular be inactivated by the anti-viral material 13.

FIG. 2 depicts a rail vehicle 15. The rail vehicle 15 is a multi-car commuter train. It may generally comprise any number of cars, i.e. may be a train of arbitrary length and capacity. Alternatively, the rail vehicle 15 may be a single car, single locomotive or single motor car.

The rail vehicle 15 comprises an air treatment system 12 in form of a roof-mounted HVAC-system. The air treatment system 12 is generally configured to regulate a supply air flow with different shares of fresh air (from the exterior) and return air, also referred to as recirculated air (e.g. returned to and/or stemming from the interior of a passenger compartment 14 of the rail vehicle 15). Accordingly, it may also recirculate air within the passenger compartment 14, while e.g. guiding it through a filter 10 as indicated in FIG. 1.

In the shown example, the rail vehicle 15 and, as a preferred option, its air treatment system 12 comprises at least one CO2 sensor 16. The CO2 sensor 16 is configured to measure a CO2 level (and specifically a concentration) within the passenger compartment 14. It is connected to a control unit 18 of the rail vehicle 15 by a dashed communication line. The control unit 18 may comprise or be connected to a non-specifically illustrated communication unit (e.g. a mobile or radio communication unit).

In case the control unit 18 determines that the CO2 measurements of the sensor 16 exceed a predefined threshold indicating an unacceptably high passenger number, a critical condition is met. A signal is then sent to an external communication unit 20. This can be done directly or by indirectly sending the signal to a centralized communication system (e.g. of the train operator) which then alerts the communication unit 20.

The communication unit 20 may be provided at an upcoming rail station 22. When receiving the signal, any of the above countermeasures can be initiated at the rail station 22 to prevent a further increase of passengers in the rail vehicle 15.

By sending the signal to the external communication unit 20 (either directly or indirectly), the rail vehicle's 15 control unit 18 prompts the implementation or activation of a countermeasure e.g. at the rail station 22.

The rail vehicle 15 may, additionally or alternatively, be operated in an anti-infection mode as follows: When at standstill, in particular for at least a defined minimum time, the control unit 18 may determine that the rail vehicle 15 is at least temporarily out of service. Any of the above alternative approaches for determining such a state may equally be implemented. When this determination has been made, the air treatment system 12 may be operated so that at least one heatable unit therein is set to a maximum temperature. Then, air within the passenger compartment 14 is channeled through the air treatment system 12 and exposed to the heatable unit and its increased temperature. This way, airborne viruses can be inactivated. Preferably, the share of recirculated air in this case outweighs the share of fresh air from the exterior. In one example, no fresh air is taken in from the exterior at all.

Still further, the rail vehicle 15 may, additionally or alternatively, be operated in an anti-infection as follows, in particular when being in service: The air treatment system 12 is run so as to reduce a level of recirculated return air (indicated by an arrow C). This way, air volumes potentially containing airborne viruses are less likely to be recirculated multiple times within the rail vehicle 15.

Instead, the share of air expelled back into the surroundings (as indicated by an arrow E) may be increased. Additionally or alternatively, the share of fresh that is sucked in from the surroundings may be increased (as indicated by arrow F). The latter may replace the reduced share of recirculated air C and/or the increased share of expelled air E. this way, a desired pressure level can be maintained within the passenger compartment 14. Thus, the ratio of recirculated air C and fresh air F may not be maintained, but the share of fresh air F may deliberately be increased.

Note that adjusting shares and volumes of the various air flows C, F, E can be achieved according to known principles and e.g. by operating suitably placed fans accordingly.

The invention claimed is:

1. An air filter for an air treatment system, the air filter comprising:

a filter structure comprising an antiviral material, the antiviral material having silver-containing particles comprising a composition containing silver chloride, wherein the antiviral material further comprises liposomes, wherein the liposomes are non-phospholipid vesicles, and wherein the silver-containing particles are a reaction mass of silver chloride and titanium.

2. The air filter according to claim 1, wherein the filter structure is impregnated with the antiviral material.

3. The air filter according to claim 1, wherein the filter structure comprises a porous material and/or a cellular material.

4. The air filter according to claim 1, wherein the filter structure comprises a fire-retardant material.

5. An air treatment system of a rail vehicle comprising an air filter according to claim 1.

6. A method for producing an air filter, comprising the steps of:

providing a filter structure;

exposing the filter structure to an antiviral material having silver-containing particles comprising a composition containing silver chloride and liposomes, wherein the liposomes are non-phospholipid vesicles, and wherein the silver-containing particles are a reaction mass of silver chloride and titanium.

* * * * *